United States Patent [19]
Allais et al.

[11] 3,909,594
[45] Sept. 30, 1975

[54] CIRCUIT FOR ESTABLISHING A REFERENCE VOLTAGE IN BAR CODE READERS

[75] Inventors: David C. Allais, Edmonds; Rudolph P. Host, Seattle, both of Wash.

[73] Assignee: Interface Mechanisms, Inc., Mountlake Terrace, Wash.

[22] Filed: Dec. 26, 1973

[21] Appl. No.: 428,039

[52] U.S. Cl. 235/61.11 E; 250/568; 340/146.3 AG
[51] Int. Cl.$^2$ G06K 7/10; G06K 11/02; G06K 9/16
[58] Field of Search ..... 235/61.11 E, 61.7 B, 61.12, 235/61.11 F, 61.7 R; 250/567, 568, 569, 570; 340/146.3 AG

[56] References Cited

UNITED STATES PATENTS

| | | | |
|---|---|---|---|
| 3,628,031 | 12/1971 | Azure | 250/569 |
| 3,675,201 | 7/1972 | McKissick | 340/146.3 AG |
| 3,701,099 | 10/1972 | Hall | 340/146.3 AG |

OTHER PUBLICATIONS

Rakl, W. K., *Dynamic Threshold Circuit;* IBM Tech. Disc. Bull., Vol. 15, No. 4, p. 1138, September 1972.
D. P. Swart, *Contrast Amplifier;* IBM Tech. Disc. Bull., Vol. 14, No. 3, p. 883, August 1971.
H. G. Olsen, *Videothresholding for Optical Scanners;* IBM Tech. Disc. Bull., Vol. 14, No. 4, p. 1127, September 1971.

*Primary Examiner*—Daryl W. Cook
*Assistant Examiner*—Robert M. Kilgore
*Attorney, Agent, or Firm*—Christensen, O'Connor, Garrison & Havelka

[57] ABSTRACT

A circuit for use in a bar code reader or similar device for establishing a reference voltage which is used by the reader to distinguish different types of bars. In operation, the reader scans the individual character bits in the code and provides a reader scan signal, the voltage level of the scan signal depending on the amount of light reflected from the particular character bit being scanned. The reader scan signal typically comprises alternating series of positive and negative peaks, each positive peak representing a white area or space (one type of character bit), and each negative peak representing a black area or bar (another type of character bit). A fast charge-slow discharge circuit responsive to the reader scan signal establishes a fast peak signal generally at the level of the successive positive peaks of the reader scan signal, and a slow charge-fast discharge circuit responsive to the reader scan signal establishes a second peak signal generally at the level of the negative peaks of the reader scan signal. These two peak signals are coupled to opposite ends of a large value of resistance, and the reference voltage signal is established at the approximate midpoint of the resistance. The value of the reference voltage signal thus is approximately midway between the value of the two peak signals. This reference voltage is then compared with the reader scan signal, and an identification signal having two levels is obtained thereby, one level of the identification signal indicating a black bar, when the reader output signal is greater than the reference voltage signal, and the other level indicating a white bar or space, when the reader scan signal is smaller than the reference voltage signal.

14 Claims, 2 Drawing Figures

CIRCUIT FOR ESTABLISHING A REFERENCE VOLTAGE IN BAR CODE READERS

BACKGROUND OF THE INVENTION

The present invention relates generally to code reading devices, and more specifically to code reader circuits which identify and distinguish particular code character bits.

In any code reading apparatus, circuitry must be established which can reliably identify the presence of particular code character bits, as the material is scanned. This is especially true in those circumstances involving more than one type of character bit, where it is necessary to first identify the type of character bit present, before the information in that character bit or combination of bits is recovered. For instance, in a bar code utilizing both printed bars and alternating spaces for conveying information, it is critical to accurately distinguish a printed bar (black bar) from a space (white bar). The identification decision is often made more difficult by printing errors such as smudging, or partial print or the like, which decrease the blackness of a bar, or the whiteness of a space.

Conventionally, a recognition device is utilized in bar code readers which provides a scan signal having a voltage level dependent on the amount of light reflected by the code character bit being scanned. Thus, a white bar (space) will result in one voltage level of the scan signal, while a dark area or bar will result in another voltage level, the two levels being connected by relatively fast voltage transitions. Each signal peak is then compared with an established voltage reference for decision on identification of the scanned character bit as either a bar or a space. However, as noted above, occasionally a given positive or negative peak may actually represent the presence of a given type of bar but not have a sufficient peak value as compared with the reference voltage level to provide such an indication. This results in code reader errors.

From the above, it is a general object of the present invention to overcome the disadvantages of the prior art.

Another object of the present invention is to provide a varying reference voltage for use in identifying code character bits.

A further object of the present invention is to utilize the reader scan voltage for establishing a varying reference voltage.

It is yet another object of the present invention to provide a varying reference voltage substantially intermediate of the successive positive and negative peaks of the reader output signal.

SUMMARY OF THE INVENTION

Accordingly, the present invention includes a circuit for use in bar code readers or the like for establishing a variable reference voltage from the reader scan signal which compensates for the varying amplitude scan signal. A first portion of the circuit establishes a first signal generally on the level of successive positive peaks of the reader scan signal, and a second portion of the circuit establishes a second signal generally on the level of successive negative peaks of the reader scan signal. The two signals are coupled to a third circuit which establishes a third signal which is at a predetermined point between the instantaneous value of the positive and negative peak signal, the third signal being the variable reference voltage.

DESCRIPTION OF THE DRAWINGS

A more thorough understanding of the invention may be obtained by study of the following detailed description taken in connection with the accompanying drawings in which.

DESCRIPTION OF THE PREFERRED EMBODIMENT

Figure 2:
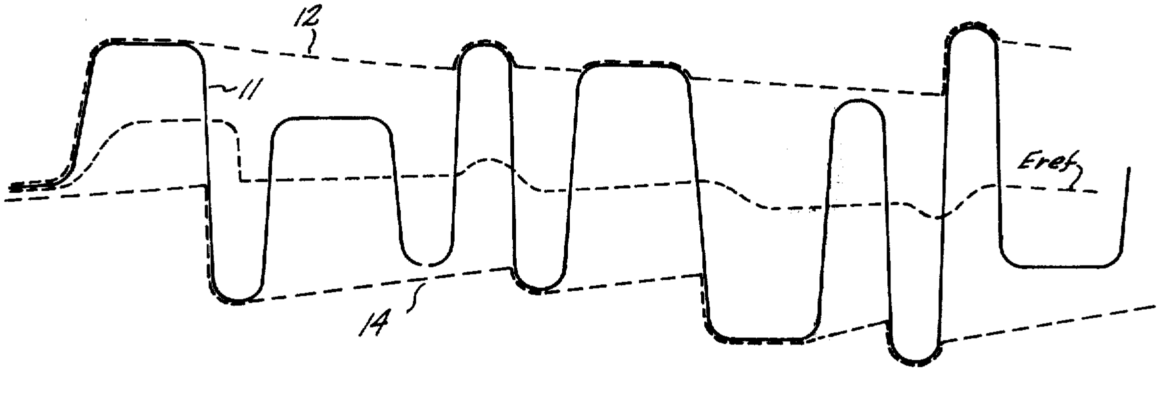
FIG. 2 is a waveform diagram showing the establishment of the varying voltage reference.

Referring to FIG. 2, a typical scan signal 11 of a conventional code reader is shown, the instantaneous voltage level of the signal 11 being dependent on the amount of light reflected back from the particular code character bit being scanned. Thus, in a bar code using a succession of alternating dark bars and spaces, each bar or space as it is scanned will result in a voltage peak of the reader scan signal. The lighter the bar the more positive or less negative the reader scan voltage peak, and the darker the bar the more negative or less positive the reader scan voltage peak. Thus, the reader scan signal for a bar code will typically be a signal having a series of alternating positive and negative peaks, such as shown in FIG. 2, with periods of rather sharp signal transition between the alternating peaks. The signal typically appears to be somewhat similar to an irregular sine wave as it alternates between positive and negative peaks.

A code reader for providing such a signal is disclosed in application, Ser. No. 296,310, entitled ELECTRO-OPTICAL READER FOR BAR CODES OR THE LIKE, by David C. Allais, and assigned to the same assignee as the present invention.

The reader scan signal 11 is then used by the circuitry of the present invention to produce a positive peak signal 12, and a negative peak signal 14, which in turn are used to establish the desired reference voltage $E_{ref}$. Signals 12 and 14 are coupled to opposing ends of a large resistance 16 (FIG. 1) and the reference voltage is taken off resistance 16 by adjustable contact 18, preferably at the midpoint of resistance 16, resulting in a reference voltage which is substantially instantaneously intermediate of signals 12 and 14. This established reference voltage is then applied as one input to a comparator 20, the other comparator input being the reader scan signal 11. When reader scan signal 11 is greater than the reference voltage, the comparator 20 provides one predetermined output, while when the reader scan signal falls below the reference voltage, a second predetermined output will result, thereby differentiating a bar from a space. These comparator predetermined outputs are then applied to well-known follow-on circuitry for conventional processing, correlation and display.

Figure 1:
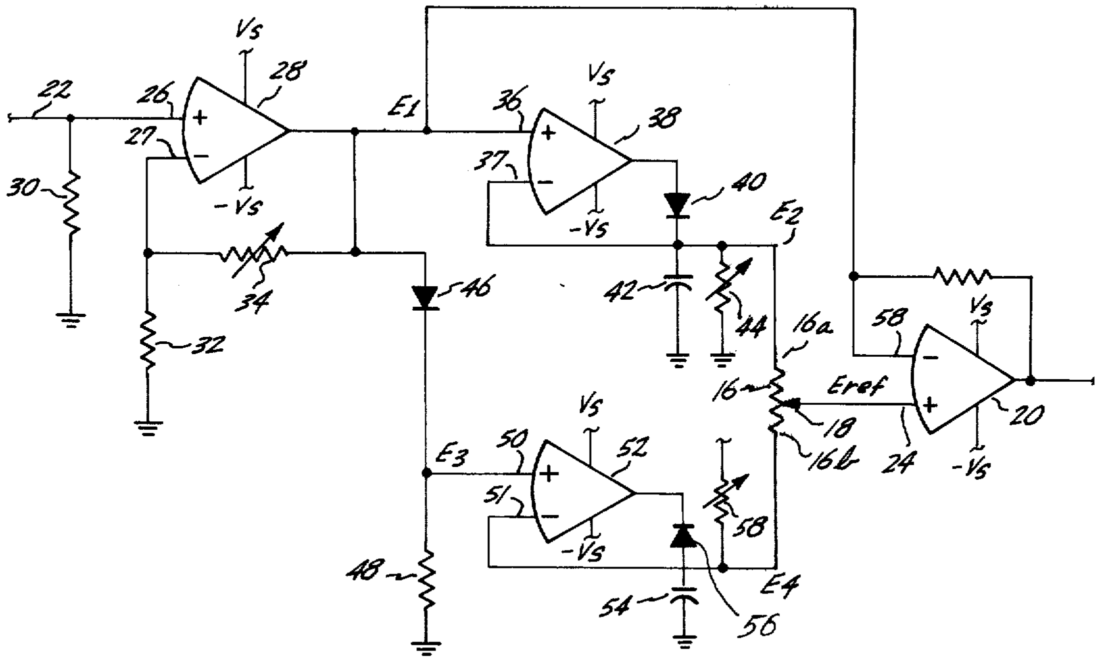
FIG. 1 is a diagram of the circuit of the present invention.

Referring to FIG. 1, an embodiment of the circuit of the present invention, which receives the reader scan signal at circuit point 22 and develops therefrom a varying reference voltage present at circuit point 24, is disclosed. The reader scan signal (signal 11 in FIG. 2) is applied to the noninverting input 26 of operational amplifier 28. Also connected to the noninverting input is resistance 30 which is typically 2KΩ and is used to establish the input impedance to the amplifier 28, which otherwise would be considerably higher. The output $E_1$ of amplifier 28 is fed back to the inverting input 27 of amplifier 28 through variable resistance 34. Resistance 32 is connected between the inverting input 27 and ground. The output $E_1$ of amplifier 28 is identical in phase to the input signal at noninverting input 26, and scaled up in amplitude by the gain factor of the operational amplifier, according to the formula:

$$\frac{\text{Resistance 32} + \text{Resistance 34}}{\text{Resistance 32}}$$

For typical resistance values of 4.7KΩ and 100KΩ, the gain factor would be equal to 22.

The output signal $E_1$ is applied to the noninverting input 36 of operational amplifier 38, which provides an output signal identical in phase with the signal at noninverting input 36 with a unity gain. The output of amplifier 38 is applied to the anode of diode 40, the cathode of which is connected to the inverting input 37 of amplifier 38, as well as capacitor 40, variable resistor 44, and resistance 16.

In operation, as signal $E_1$ begins to rise with the rise in reader scan voltage (signal 11 in FIG. 2) the output of amplifier 38 will rise correspondingly. This output signal will be passed by diode 40, which is forward biased by the rising output of amplifier 38, and begins to charge capacitor 42. The voltage on capacitor 42 thus follows substantially instantaneously the rise of the amplified reader scan signal $E_1$. As the output of amplifier 38 reaches a peak, however, and begins to decrease, capacitor 42, which has charged to the peak value of the amplifier 38 output, will be prevented from dischargng back through the operational amplifier 38 by the diode 40, which is now reversed biased, and will discharge primarily through variable resistance 44, which is typically 100 K ohms, to ground.

The signal $E_2$ at the junction of the diode 40, capacitor 42 and resistor 44 will follow the cyclical charging and discharging of capacitor 42. Since the time constant established by resistor 44 and capacitor 42 is long compared to the period of the amplified reader output signal $E_1$, signal $E_2$ (signal 12 in FIG. 2) will tend to follow the more positive peaks of signal $E_1$. Signal $E_2$ is coupled to one end 16a of variable resistor 16, which is large compared to resistance 44, typically 1 Megohm.

Signal $E_1$ is also applied to a series circuit comprising diode 46, and resistance 48, which together function as a voltage divider. Signal $E_3$ is obtained at the junction of diode 46 and resistance 48 and is applied to the noninverting input 50 of operational amplifier 52. Signal $E_3$ is thus substantially identical to signal $E_1$, although reduced in amplitude by the amount of voltage drop across diode 46, typically a few tenths of a volt. This diode voltage drop provides a small voltage separation between reference signals $E_1$ and $E_3$.

As signal $E_3$ begins to rise with the rise in reader scan voltage (signal 11 in FIG. 2), the output of operational amplifier 52 will follow, similarly to the output of amplifier 38. The output of amplifier 52 is applied to the cathode of diode 56, the anode of which is connected to inverting input 51, capacitor 54, variable resistor 58, and resistance 16. The amplifier 52 output will be initially blocked from charging capacitor 54 by the diode 56, which is reversed biased by the rising amplifier output. This reverse biasing of diode 56 permits capacitor 54 to be charged by the 12 volt circuit supply through resistor 58. Thus, as long as the output of amplifier 52 continues to be positive with respect to the voltage on capacitor 54, capacitor 54 will attempt to charge toward 12 volts through variable resistance 58, which is typically 100 K ohms. When the output of amplifier 52 becomes more negative than the voltage on capacitor 54, and continues to fall negatively, the voltage on capacitor 54 will attempt to follow that falling voltage. Capacitor 54 will discharge through the diode 56, which is now forward biased, and the amplifier 52 as long as the output of amplifier 52 continues to go more negative. Furthermore, since this discharge path has a very small time constant, the voltage across the capacitor 54 will closely follow certain of the negative going peaks of signal $E_3$, which is an amplified version of the reader scan signal 11. Signal $E_4$ at the junction of diode 56, capacitor 54 and resistance 58, corresponds to signal 14 in FIG. 2, and slowly rises as capacitor 54 charges during the time when the output of amplifier 52 is more positive than the capacitor voltage and will fall quickly, following the signal $E_3$, as the output of amplifier 52 goes more negative than the capacitor voltage.

Signal $E_4$ is coupled to the other side **16*b* of resistance 16. One end 16*a* of resistance 16 is thus generally near the positive peaks of signal $E_1$, while the other end 16*b* remains generally near the negative peaks of signal $E_1$. The reference voltage $E_{ref}$ is then obtained at a predetermined point along resistance 16, generally at the resistance midpoint if a reference voltage substantially instantaneously intermediate of the two peak signals $E_2$ and $E_4$ is desired. This reference voltage $E_{ref}$ is applied to the noninverting input 24 of operational amplifier 20, which is connected in conventional fashion as a comparator. The amplifier reader output signal $E_1$ is applied to the inverting input 58 of the comparator. In operation, when the signal $E_1$ at amplifier input 58 is greater than the reference voltage $E_{ref}$ at input 24, indicating the immediate scan of a white bar or space, a signal of −12 volts is provided at the amplifier output. If on the other hand, signal $E_1$ at input 58 is less than the reference voltage $E_{ref}$ at input 24, indicating the immediate scan of a dark bar, the output signal is +12 volts. The output of comparator 20** thus provides an accurate identification of the type of character bit being scanned.

Thus, a circuit has been disclosed which provides a reference voltage generated directly from a code reader scan signal, which reference voltage may be conveniently used to accurately identify the particular character bit being scanned by the reader.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. A circuit for establishing a reference signal useful in a bar code character reader, said reference signal being established from a reader scan signal having positive and negative peaks and an instantaneous amplitude which is proportional to the amount of light reflected from bar code characters scanned by said reader, said circuit comprising:

first circuit means responsive to said reader scan signal for generating a first varying amplitude signal, including means for increasing said first varying amplitude signal proportionally in amplitude with said reader scan signal as long as said reader scan signal rises positively with respect to and is more positive in amplitude than said first varying amplitude signal, and further including means for decreasing said first varying amplitude signal at a first predetermined rate as long as said reader scan signal is less positive in amplitude than said first varying amplitude signal, said first circuit means further including first storing means for storing said first varying amplitude signal as said first varying amplitude signal increases positively in amplitude, thereby providing a first stored voltage, means for discharging said first storing means at said first predetermined rate as long as said reader scan signal is less positive in amplitude than said first varying amplitude signal, said first circuit means further including a first amplifier and a first diode having an anode and a cathode, said first amplifier having in operation an output applied to the anode of said first diode, said cathode being connected to said first storing means, said amplifier operative to produce at said cathode of said diode a first diode output voltage, thereby charging said first storing means, said first diode operative to block discharge of said first storing means once said first diode output voltage is less positive in amplitude than said first stored voltage;

second circuit means responsive to said reader scan signal for generating a second varying amplitude signal, including means for increasing said second varying amplitude signal in amplitude at a second predetermined rate as long as said reader scan signal is more positive in amplitude than said second varying amplitude signal, and further includes means for decreasing said second varying amplitude signal to conform to said reader scan signal as long as said reader scan signal is less positive in amplitude than said varying amplitude signal, said second circuit means further including second storing means for storing said second varying amplitude signal as it increases positively in amplitude, thereby providing a second stored voltage, said first and second predetermined rates being sufficiently slow such that relatively little change occurs in the amplitudes of said first and second stored voltages between successive positive peaks and successive negative peaks of said reader scan signal, said second circuit means further including means for discharging said second storing means to substantially conform said second varying amplitude signal to said reader scan signal as long as said reader scan signal is less positive in amplitude than said second varying amplitude signal, said second circuit means further including a second amplifier and a second diode having an anode and cathode, said second amplifier having in operation an output applied to the cathode of said second diode, the anode of said second diode being connected to said second storing means, said second diode operative to block said second amplifier output from said second storing means and permit said second storing means to charge from a fixed voltage source, said second diode further operative to permit said second storing means to discharge through said second diode and said second amplifier when said second stored voltage is more positive in amplitude than said second amplifier output;

means coupled to said first and second circuit means for establishing a third varying amplitude signal having a predetermined relationship with said first and second varying amplitude signals, said third varying amplitude signal being said reference signal, said third circuit means including a resistance means having two ends and a midpoint connection therebetween, means applying said first varying amplitude signal to one end of said resistance means and means applying said second varying amplitude signal to the other end of said resistance means, said reference signal being provided at said midpoint connection of said resistance means, said reference signal being substantially instantaneous intermediate in amplitude of said first and second varying amplitude signals; and a comparator, responsive to said reference signal and said reader scan signal, said comparator providing a first output signal when said reference signal is more positive in amplitude than said reader scan signal, and a second output signal when said reference signal is less positive in amplitude than said reader scan signal.

2. The circuit of claim 1, wherein said first storing means is a first capacitor and wherein said first circuit means further includes, in parallel connection with said first capacitor, a first resistor, said parallel connection of said first capacitor and said first resistor having two ends, one end of said parallel connection being connected to the cathode of said first diode and said one end of said resistance means, the other end of said parallel connection being connected to ground.

3. The circuit of claim 2, wherein said second storing means is a second capacitor having two sides, and wherein said second circuit means further includes a second resistor having two ends, one side of said second capacitor being commonly connected to the anode of said second diode, one end of said second resistor and said other end of said resistance means, the other side of said second capacitor being connected to ground.

4. The circuit of claim 3, wherein said second circuit means includes a voltage divider, responsive to said reader scan signal and operative to provide an input signal to said second amplifier reduced in amplitude compared to said reader scan signal.

5. A circuit for establishing a reference signal useful in a bar code character reader, said reference signal being established from a reader scan sighal having positive and negative peaks and an instantaneous amplitude which is proportional to the amount of light reflected from the bar code characters scanned by said bar code character reader, the circuit comprising;

first circuit means responsive to said reader scan signal for generating a first signal having a varying amplitude, including means for increasing the amplitude of said first signal proportionally with an increase in the amplitude of said reader scan signal as long as the amplitude of said reader scan signal is more positive than the amplitude of said first signal;

a source of DC voltage;

second circuit means responsive to said reader scan signal for generating a second signal having a varying amplitude, said second circuit means including voltage storing means adapted to have a stored voltage therein, said stored voltage comprising said second signal, said second circuit means further including means for charging said voltage storing means from said source of DC voltage as long as the amplitude of said reader scan signal is more positive than the amplitude of said stored voltage, and means for discharging said voltage storing means, such that the amplitude of said stored voltage substantially conforms to the amplitude of said reader scan signal, as long as the amplitude of said reader scan signal is less positive than the amplitude of said stored voltage; and third circuit means responsive to said first and second signals for establishing a third signal of varying amplitude, including means for maintaining the amplitude of said third signal between the amplitudes of said first and second signals, wherein said third signal comprises said reference signal.

6. A circuit of claim 5, wherein said maintaining means includes selection means establishing the amplitude of said third signal at a selected constant percentage between the amplitudes of said first and second signals.

7. A circuit of claim 5, wherein said second circuit means includes means operative to block said reader scan signal from charging said voltage storing means at least as long as the amplitude of said stored voltage is more positive than the amplitude of said reader scan signal.

8. A circuit of claim 7, wherein said blocking means is a diode.

9. An apparatus of claim 5, wherein said voltage storing means charges from said voltage source at a predetermined rate, and wherein said second circuit means includes resistance means connected between said voltage source and said voltage storing means for controlling said predetermined rate.

10. An apparatus of claim 5, wherein said discharging means discharges said voltage storing means at a given rate, said given rate being sufficiently fast that the amplitude of said stored voltage substantially follows the amplitude of said reader scan signal as long as said voltage storing means is being discharged.

11. An apparatus of claim 7, wherein said second circuit means includes an amplifier having input and output connections, wherein said diode includes anode and cathode connections, and wherein said voltage storing means is a capacitor, said amplifier being responsive at said input connection to said reader scan signal, said second circuit means including means coupling the output connection of said amplifier to the cathode connection of said diode, and means coupling the anode connection of said diode to said capacitor, said diode permitting said capacitor to discharge through said diode and said amplifier as long as the amplitude of said reader scan signal is less positive than said stored voltage in said capacitor.

12. A circuit in accordance with claim 6, wherein said maintaining means includes resistance means having two ends, means coupling said first signal to one end thereof, and means coupling said second signal to the other end thereof, and wherein said selection means includes signal pick-off means contacting said resistance means at a selected point between said two ends of said resistance means.

13. A circuit in accordance with claim 12, wherein said selected point is substantially the midpoint of the length of said resistance means, said reference signal thereby having an amplitude substantially intermediate of the amplitudes of said first and second signals.

14. A circuit in accordance with claim 5, including a comparator responsive to said reference signal and said reader scan signal, said comparator providing an output signal having a first magnitude when said reference signal is more positive in amplitude than said reader scan signal, and a second magnitude when said reference signal is less positive in amplitude than said reader scan signal.

* * * * *